United States Patent
Pan et al.

(10) Patent No.: US 12,119,464 B2
(45) Date of Patent: Oct. 15, 2024

(54) METHOD FOR PREFERENTIALLY RECOVERING MANGANESE FROM WASTE LITHIUM-RICH MANGANESE-BASED CATHODE MATERIAL

(71) Applicant: BEIJING UNIVERSITY OF TECHNOLOGY, Beijing (CN)

(72) Inventors: Dean Pan, Beijing (CN); Xiaoguang Zhang, Beijing (CN); Yifan Wang, Beijing (CN); Qijun Zhang, Beijing (CN); Wei Wang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 18/507,242

(22) Filed: Nov. 13, 2023

(65) Prior Publication Data

US 2024/0170751 A1   May 23, 2024

Related U.S. Application Data

(63) Continuation of application No. PCT/CN2023/088344, filed on Apr. 14, 2023.

(30) Foreign Application Priority Data

Nov. 21, 2022 (CN) .......................... 202211455436.0

(51) Int. Cl.
   *H01M 10/54* (2006.01)
   *C22B 1/00* (2006.01)
   (Continued)

(52) U.S. Cl.
   CPC ............. *H01M 10/54* (2013.01); *C22B 1/005* (2013.01); *C22B 3/08* (2013.01); *C22B 3/22* (2013.01);
   (Continued)

(58) Field of Classification Search
   CPC .. C22B 1/005; C22B 3/08; C22B 3/22; C22B 3/26; C22B 7/006; H01M 10/54
   See application file for complete search history.

(56) References Cited

FOREIGN PATENT DOCUMENTS

| CN | 108767354 A | 11/2018 |
| CN | 109193057 A | 1/2019 |

(Continued)

OTHER PUBLICATIONS

CN 108767354 B machine translation, originally published Feb. 26, 2021, translated May 31, 2024 (Year: 2021).*

(Continued)

*Primary Examiner* — George Wyszomierski
*Assistant Examiner* — Nikolas Takuya Pullen
(74) *Attorney, Agent, or Firm* — Nitin Kaushik

(57) ABSTRACT

The present invention provides a method for preferentially recovering manganese from waste lithium-rich manganese-based cathode material, the method comprising: step 1) calcination and leaching: mixing the waste lithium-rich manganese-based cathode material with ammonium sulfate and then performing low-temperature calcination, leaching the calcination product with water, and then performing solid-solution separation to obtain a leaching solution; step 2) complexing and manganese separating: adding ammonium sulfite to the leaching solution obtained in step 1) for a complex reaction to obtain manganese-rich residue; step 3) oxidation leaching: adding an oxidant to the manganese-rich residue obtained in step 2) to perform oxidation leaching, and adjusting the pH of the solution to obtain a manganese-rich solution; and step 4) extracting and stripping. The method realizes the preferential and productive recovering of manganese from waste lithium-rich manganese-based (Continued)

cathode materials, avoids the negative impact of polymetals in the conventional recovery process, and has economic and environmental benefits.

7 Claims, 2 Drawing Sheets

(51) Int. Cl.
    *C22B 3/08*     (2006.01)
    *C22B 3/22*     (2006.01)
    *C22B 3/26*     (2006.01)
    *C22B 7/00*     (2006.01)
    *C22B 47/00*    (2006.01)

(52) U.S. Cl.
    CPC ................ *C22B 3/26* (2021.05); *C22B 7/006* (2013.01); *C22B 47/00* (2013.01)

(56) References Cited

FOREIGN PATENT DOCUMENTS

| CN | 112575208 A | * | 3/2021 | ............... C22B 3/08 |
| CN | 113582255 A | * | 11/2021 | |
| CN | 114231744 A | | 3/2022 | |

OTHER PUBLICATIONS

CN 109193057 B machine translation, originally published Apr. 7, 2020, translated May 31, 2024 (Year: 2020).*

* cited by examiner

Step 1) calcining and leaching: mixing the waste lithium-rich manganese-based cathode material with ammonium sulfate and then performing low-temperature calcination to obtain a calcination product, leaching the calcination product with water, and performing solid-solution separation after the completion of the water leaching to obtain leaching residue and a leaching solution

Step 2) complexing and manganese separating: adding ammonium sulfite to the leaching solution obtained in step 1) for a complex reaction, aging after the completion of the complex reaction, and filtering after the completion of the aging to obtain manganese-rich residue and a manganese-separated solution

Step 3) oxidation leaching: adding an oxidant to the manganese-rich residue obtained in step 2) to perform oxidation leaching, adding 98% concentrated sulfuric acid to adjust the pH of the solution, and obtaining a manganese-rich solution after the completion of the reaction

Step 4) extracting and stripping: performing multi-stage extraction of manganese on the manganese-rich solution obtained in step 3) to obtain a manganese-loaded organic phase and a raffinate; mixing the raffinate with the manganese-separated solution obtained in step 2) for a recovery treatment, and stripping the manganese-loaded organic phase to obtain a manganese sulfate solution

FIG. 1

METHOD FOR PREFERENTIALLY RECOVERING MANGANESE FROM WASTE LITHIUM-RICH MANGANESE-BASED CATHODE MATERIAL

CROSS-REFERENCE TO RELATED APPLICATIONS

The application claims priority to Chinese patent application No. 2022114554360, filed on Nov. 21, 2022, the entire contents of which are incorporated herein by reference.

TECHNICAL FIELD

The present invention belongs to the field of recovery of valuable metals from waste lithium battery cathode material, and in particular to a method for preferentially recovering manganese from waste lithium-rich manganese-based cathode material.

BACKGROUND

Lithium-rich manganese-based cathode material having a formula of $xLi_2MnO_3 \cdot (1-x)LiMO_2$ (M is one or more of Ni, Mn, and Co), a new generation of high-performance lithium battery cathode material, has been widely studied due to its high specific capacity, low cost, and low toxicity. With the continuous expansion of demand for the lithium-rich manganese-based cathode material, a large amount of lithium battery waste is generated, and disposal at will can lead to secondary pollution to the environment. At the same time, the valuable metals (such as lithium, nickel, manganese cobalt, etc.) in the lithium-rich manganese-based cathode material have exceeded the natural ore resources, making them of great recycling value. Therefore, how to recover lithium-rich manganese-based cathode material correctly is the key direction to solving environmental and resource problems.

Compared with traditional cathode materials, lithium-rich manganese-based cathode materials have higher manganese content (about 30% by mass of manganese), so recycling and preparing manganese products as a secondary manganese source has become an important way for resource utilization. Generally, the separation of manganese from valuable metals such as lithium, nickel, cobalt, etc., is a critical step in the recovery of high-purity manganese products from the cathode material. However, due to the interference of valuable metals such as lithium, nickel, cobalt, etc., it is difficult in the prior art to achieve a deep separation of manganese from other metals by only a single extraction step, and a complicated and inefficient purification process may lead to loss of metals, which reduces the overall recovery efficiency of manganese.

Therefore, how to achieve efficient conversion of the key metals of lithium, nickel, manganese, and cobalt in the waste lithium-rich manganese-based cathode material, and perform preferential extraction and utilization of the manganese therein so as to avoid the interference of valuable metals such as nickel, cobalt, and lithium on the recovery rate of manganese in the recovery process are problems to be solved urgently by a person skilled in the art.

SUMMARY

To overcome the problems above, the present invention provides a method for preferentially recovering manganese from waste lithium-rich manganese-based cathode material, the method comprising: step 1) calcining and leaching: mixing the waste lithium-rich manganese-based cathode material with ammonium sulfate and then performing low-temperature calcination to obtain a calcination product, leaching the calcination product with water, and performing solid-solution separation after the completion of the water leaching to obtain leaching residue and a leaching solution; step 2) complexing and manganese separating: adding ammonium sulfite to the leaching solution obtained in step 1) for a complex reaction, aging after the completion of the complex reaction, and filtering after the completion of the aging to obtain manganese-rich residue and a manganese-separated solution: step 3) oxidation leaching: adding an oxidant to the manganese-rich residue obtained in step 2) to perform oxidation leaching, adding 98% concentrated sulfuric acid to adjust the pH of the solution, and obtaining a manganese-rich solution after the completion of the reaction; and step 4) extracting and stripping: performing multi-stage extraction of manganese on the manganese-rich solution obtained in step 3) to obtain a manganese-loaded organic phase and a raffinate; mixing the raffinate with the manganese-separated solution obtained in step 2) for a recovery treatment, and stripping the manganese-loaded organic phase to obtain a manganese sulfate solution.

A still further technical solution of the present invention is: in step 1), when performing low-temperature calcination, the amount of ammonium sulfate added is 1.1-1.5 times theoretical molar ratio of Li, Ni, Mn, and Co in the waste lithium-rich manganese-based cathode material; the calcination temperature is 300-500° C.; and the calcination holding time is 15-35 min.

A still further technical solution of the present invention is: in step 1), when the calcination product is leached with water, the solid-solution ratio of the leaching is 1:5-1:20 g/mL; the leaching temperature is 25-60° C.; and the leaching time is 20-40 min.

A still further technical solution of the present invention is: in step 2), the amount of ammonium sulfite added is 3-5 times theoretical value of manganese complex precipitation in the leaching solution.

A still further technical solution of the present invention is: in step 2), when the complex reaction is performed, the pH value of the complex solution is adjusted to 7-10 with ammonia water; the complex reaction temperature is 25-70° C.; the complex reaction time is 20-60 min; and the aging time is 1-8 h.

A still further technical solution of the present invention is: in step 3), when performing oxidation leaching, the oxidant is hydrogen peroxide: the amount of hydrogen peroxide added is 0.5-2 mol per liter of the solution; and the solid-solution ratio of the leaching is 1:5-1:20 g/mL.

A still further technical solution of the present invention is: in step 3), the pH of the solution is adjusted to 1-5 with 98% concentrated sulfuric acid; the leaching temperature is 25-60° C.; and the leaching time is 10-25 min.

A still further technical solution of the present invention is: in step 4), the extractant is one of P204 and P507; the saponification agent is ammonia water with a molar concentration of 5-15 mol/L; the diluent is sulfonated kerosene; the extraction O/A phase ratio is 1:1-1:3; the extraction pH value is 1-5; the extraction temperature is 25-45° C.; the extraction time is 5-25 min; and the stage of extraction is 2-5.

A still further technical solution of the present invention is: in step 4), the manganese-loaded organic phase is stripped with 2-6 mol/L sulfuric acid; the stripping O/A phase ratio is 3:1-1:1: the stripping temperature is 25-45° C.; the stripping time is 10-30 min; and the stage of stripping is 2-5, to obtain the manganese sulfate solution.

A still further technical solution of the present invention is: in step 1), when performing low-temperature calcination, the amount of ammonium sulfate added is 1.5 times theoretical reaction molar ratio of Li, Ni, Mn, and Co in the waste lithium-rich manganese-based cathode material: the calcination temperature is 500° C.; and the calcination holding time is 35 min; when the calcination product is leached with water, the solid-solution ratio of the leaching is 1:20 g/mL: the leaching temperature is 60° C.; and the leaching time is 35 min: in step 2), the amount of ammonium sulfite added is 5 times theoretical value of manganese complex precipitation in the leaching solution; when the complex reaction is performed, the pH value of the complex solution is adjusted to 10 with ammonia water: the complex reaction temperature is 70° C.: the complex reaction time is 60 min; and the aging time is 8 h. in step 3), when performing oxidation leaching, the oxidant is hydrogen peroxide: the amount of hydrogen peroxide added is 2 mol per liter of solution; and the solid-solution ratio of the leaching is 1:20 g/mL: the pH of the solution is adjusted to 5 with 98% concentrated sulfuric acid: the leaching temperature is 60° C.; and the leaching time is 25 min; and in step 4), the extractant is P204: the saponification agent is ammonia water with a molar concentration of 15 mol/L: the diluent is sulfonated kerosene: the extraction O/A phase ratio is 1:3: the extraction pH value is 5: the extraction temperature is 45° C.: the extraction time is 25 min; and the stage of extraction is 5: the manganese-loaded organic phase is stripped with 6 mol/L sulfuric acid: the stripping O/A ratio is 3:1; the stripping temperature is 45° C.: the stripping time is 30 min; and the stage of stripping is 5.

Advantageous Effects: the present invention proposes a method for preferentially recovering manganese from a waste lithium-rich manganese-based cathode material, which comprises at least steps of calcining and leaching, complexing and manganese separating, oxidation leaching, and extracting and stripping, has the features of low cost, short time consumption and high purity of the recovered product, and solves the problems of conversion and recovery of valuable metals in the waste lithium-rich manganese-based cathode material, and preferential extraction and purification of manganese. At the same time, the key metals of lithium, nickel, manganese, and cobalt in the waste lithium-rich manganese-based cathode material can be efficiently converted by low-temperature calcination-water leaching, and the metal conversion rate can be more than 98%, greatly reducing the reaction time, reducing energy consumption and cost, and avoiding the use of toxic chemical reagents. The preferential enrichment of manganese in leaching solution can be achieved by complexation of manganese: the ratio of manganese to impurity (lithium, nickel, and cobalt) can be increased by more than 10 times, reducing the negative effects of other metals (lithium, nickel, and cobalt) on manganese extraction in the subsequent purification process, improving the purity of manganese products. The ratio of manganese and impurities in the whole process is increased by more than 200 times, and the recovery rate of manganese is more than 95%.

BRIEF DESCRIPTION OF DRAWINGS

In order to more clearly illustrate the technical solutions of the embodiments of the present invention or prior art, the drawings used in the embodiments are briefly described below, and it is obvious that the drawings in the description below are only some embodiments of the present invention, and that other drawings can be obtained from these drawings without involving any inventive effort for a person skilled in the art.

FIG. 1 is a flow chart I of a method for preferentially recovering manganese from a waste lithium-rich manganese-based cathode material according to an embodiment of the present invention.

DETAILED DESCRIPTION OF THE EMBODIMENTS

Figure 2:
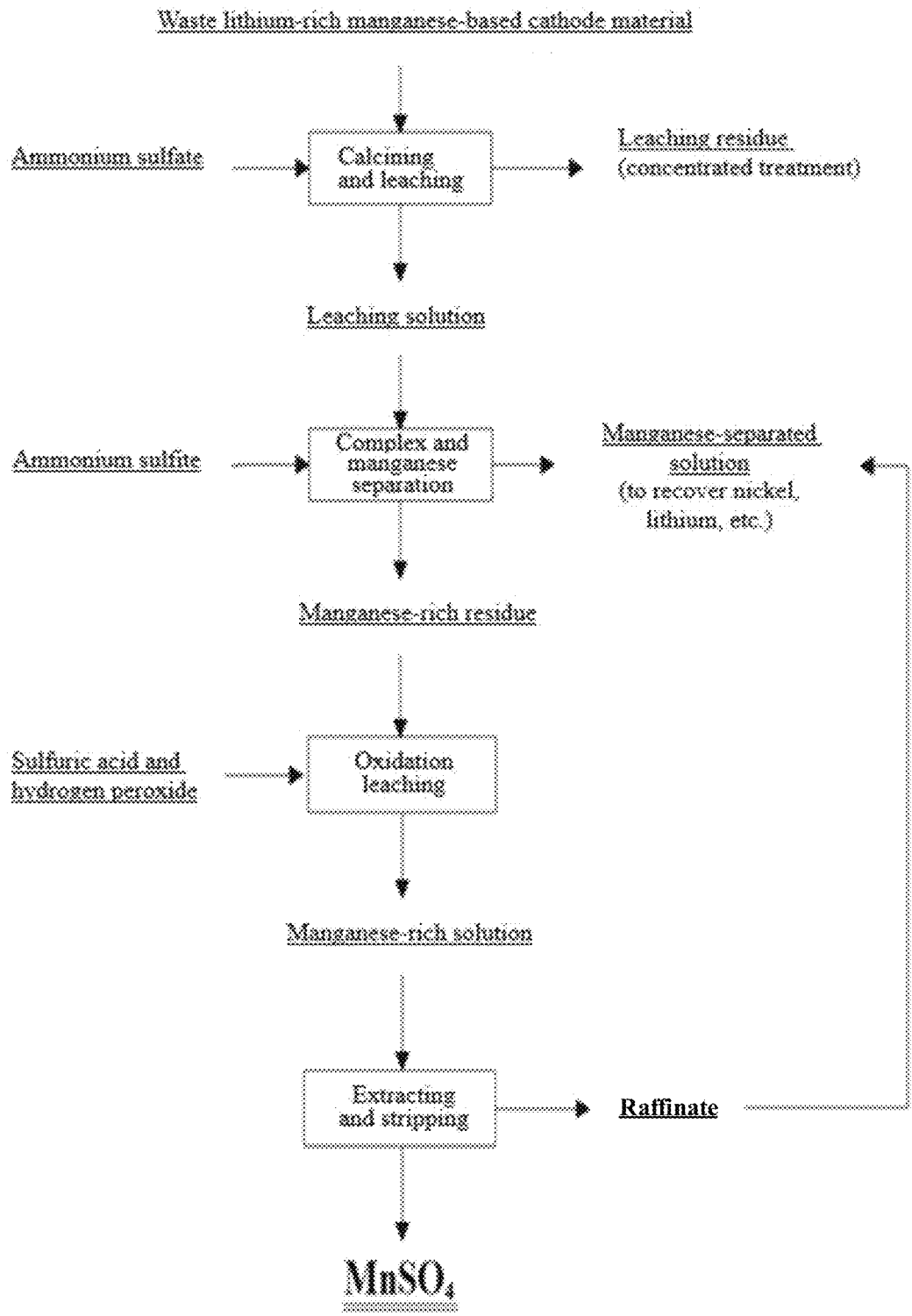
FIG. 2 is a flow chart II of a method for preferentially recovering manganese from a waste lithium-rich manganese-based cathode material according to an embodiment of the present invention.

The following will provide a clear and complete description of the technical solution in the present invention in conjunction with the accompanying drawings. Obviously, the described embodiments are only a part of the embodiments of the present invention rather than all the embodiments. Based on the embodiments of the present invention, all other embodiments obtained by a person of ordinary skill in the art fall within the scope of the present invention.

Meanwhile, throughout the specification, terms used herein should be understood as generally used in the art unless otherwise indicated. Unless otherwise defined, all technical and scientific terms used herein have the same meaning as commonly understood by one skilled in the art to which this invention belongs. In case of conflict, the present specification shall control.

Unless otherwise specifically noted, the various starting materials, reagents, instruments, equipment, and the like used in the present invention are either commercially available or may be prepared by known methods.

Example 1

As shown in FIGS. 1 and 2, this example provided a method for preferentially recovering manganese from waste lithium rich manganese based cathode materials, which included: step 1) calcining and leaching: the waste lithium-rich manganese-based cathode material was mixed with ammonium sulfate and then the mixture was subjected to low-temperature calcination to obtain a calcination product: the calcination product was leached with water, and subjected to solid-solution separation after the completion of the water leaching to obtain leaching residue and a leaching solution: step 2) complexing and manganese separating: ammonium sulfite was added to the leaching solution obtained in step 1) for a complex reaction; aging was performed after the completion of the complex reaction; and the reaction solution was filtered after the completion of the aging to obtain manganese-rich residue and a manganese-separated solution: step 3) oxidation leaching: an oxidant was added to the manganese-rich residue obtained in step 2) to perform oxidation leaching: 98% concentrated sulfuric acid was added to adjust the pH of the solution; and a manganese-rich solution was obtained after the completion of the reaction; and step 4) extracting and stripping: multi-stage extraction of manganese was performed on the manganese-rich solution obtained in step 3) to obtain a manganese-loaded organic phase and a raffinate: the raffinate was mixed with the manganese-separated solution obtained in step 2) for a recovery treatment; and the manganese-loaded organic phase was stripped to obtain a manganese sulfate solution.

The present invention proposes a method for preferentially recovering manganese from a waste lithium-rich manganese-based cathode material, which comprises at least steps of calcining and leaching, complexing and manganese separating, oxidation and leaching, and extracting and stripping, has the features of low cost, short time consumption and high purity of the recovered product, and solves the problems of conversion and recovery of valuable metals in the waste lithium-rich manganese-based cathode material, and preferential extraction and purification of manganese. At the same time, the key metals of lithium, nickel, manganese, and cobalt in the waste lithium-rich manganese-based cathode material can be efficiently converted by low-temperature calcination-water leaching, and the metal conversion rate can be more than 98%, greatly reducing the reaction time, reducing energy consumption and cost, and avoiding the use of toxic chemical reagents. The preferential enrichment of manganese in leaching solution can be achieved by complexation of manganese: the ratio of manganese to impurity (lithium, nickel, and cobalt) can be increased by more than 10 times, reducing the negative effects of other metals (lithium, nickel, and cobalt) on manganese extraction in the subsequent purification process, improving the purity of manganese products. The ratio of manganese and impurities in the whole process is increased by more than 200 times, and the recovery rate of manganese is more than 95%.

In some possible embodiments, in step 1), when performing low-temperature calcination, the amount of ammonium sulfate added is 1.1-1.5 times theoretical molar ratio of Li, Ni, Mn, and Co in the waste lithium-rich manganese-based cathode material; the calcination temperature is 300-500° C.; and the calcination holding time is 15-35 min.

This is because Li, Ni, Mn, and Co in the waste lithium-rich manganese-based cathode material can be fully reacted with ammonium sulfate by adding 1.1-1.5 times theoretical reaction molar ratio of Li, Ni, Mn, and Co in the waste lithium-rich manganese-based cathode material; the molten ammonium sulfate and its thermal decomposition products (such as ammonium bisulfate) can be reacted with metal oxides to form metal ammonium sulfate salts (such as $NH_4LiSO_4$) by calcining at 300-500° C. for 15-35 min. The unstable metal ammonium sulfate salts can be further decomposed into stable metal sulfate salts ($Li_2SO_4$, etc.) as the reaction proceeds.

In some possible embodiments, in step 1), when the calcination product is leached with water, the solid-solution ratio of the leaching is 1:5-1:20 g/mL: the leaching temperature is 25-60° ° C.; and the leaching time is 20-40 min.

It will be appreciated by those skilled in the art that the leaching solution can be formed by leaching the calcination product with water at a solid-to-solution ratio of 1:5-1:20 g/mL, a leaching temperature of 25-60° C. and a leaching time of 20-40 min to dissolve the sulfate in the calcination product in water.

In some possible embodiments, in step 2), the amount of ammonium sulfite added is 3-5 times theoretical value of manganese complex precipitation in the leaching solution.

It will be appreciated by those skilled in the art that by adding an amount of ammonium sulfite that is 3-5 times theoretical value of manganese complexation precipitation in the leaching solution, the maximum degree of complex reaction between ammonium sulfite and manganese in the leaching solution can be achieved.

In some possible embodiments, in step 2), during the complex reaction, the pH of the complex solution is adjusted to 7-10 with ammonia water; the complex reaction temperature is 25-70° C.: the complex reaction time to 20-60 min; and the aging time is 1-8 h.

This is because ammonia water is used to adjust the pH value of the complex solution to 7-10 so that ammonium and sulfite are present in the solution. Under alkaline conditions, lithium, nickel, manganese, and cobalt are finally present in the form of an ammonium complex, while the manganese ammonium sulfite produced is present in the form of a precipitate in the manganese-rich residue, and the remaining metal ammonium complex is present in the form of a soluble substance in the manganese separating solution. Under the conditions of pH values of 7-10, the precipitation rate of manganese can be improved, and the co-precipitation of lithium, nickel, and cobalt can be prevented. By setting the complex reaction temperature to 25-70° C., the decomposition or oxidation of ammonium sulfite due to too high complex reaction temperature is avoided, thereby reducing the binding efficiency of manganese with ammonium sulfite and thus reducing the precipitation rate of manganese.

In some possible embodiments, in step 3), when performing oxidation leaching, the oxidant is hydrogen peroxide: the amount of hydrogen peroxide added is 0.5-2 mol per liter of the solution; and the solid-solution ratio of the leaching is 1:5-1:20 g/mL.

This is due to the fact that the transformation of the manganese-containing product from a solid to a solution state is achieved by oxidizing poorly soluble ammonium manganese sulfite to ammonium manganese sulfate, which is readily soluble in water by using hydrogen peroxide as an oxidant in an amount of 0.5-2 mol per liter of solution and a leaching solid-to-solution ratio of 1:5-1:20 g/mL.

In some possible embodiments, in step 3), the pH of the solution is adjusted to 1-5 with 98% concentrated sulfuric acid; the leaching temperature is 25-60° ° C.; and the leaching time is 10-25 min.

This is because the pH of the solution is adjusted to 1-5 by 98% concentrated sulfuric acid to ensure that the acidity of the manganese-rich solution is similar to that required in the subsequent extraction process so as to facilitate the subsequent extracting and stripping process for the manganese-rich solution.

In some possible embodiments, in step 4), the extractant is one of P204 and P507; the saponification agent is ammonia water with a molar concentration of 5-15 mol/L; the diluent is sulfonated kerosene; the extraction O/A phase ratio is 1:1-1:3; the extraction pH value is 1-5; the extraction temperature is 25-45° C.: the extraction time is 5-25 min; and the stage of extraction is 2-5.

This is because one of P204 and P507, as an extractant, can selectively combine with the extracted metal manganese ion. Ammonia water with a molar concentration of 5-15 mol/L used as a saponification agent gives the acidic extractant the structure and properties of a surfactant after saponification and improves the extraction performance of the extractant. Sulfonated kerosene, as a diluent with a small specific gravity, is an inert solvent that does not react with manganese ions. It can be used to adjust the concentration of the extractant and reduce the viscosity and specific gravity of the organic phase, facilitating phase separation. The extraction efficiency can be improved by multi-stage extraction with extraction O/A ratio of 1:1-1:3, extraction pH of 1-5, extraction temperature of 25-45° C., extraction time of 5-25 min, and the stage of extraction of 2-5 to obtain manganese-loaded organic phase.

In some possible embodiments, in step 4), the manganese-loaded organic phase is stripped with 2-6 mol/L sulfuric acid: the stripping O/A phase ratio is 3:1-1:1; the stripping temperature is 25-45° C.; the stripping time is 10-30 min; and the stage of stripping is 2-5, to obtain the manganese sulfate solution.

This is because the stripping efficiency can be improved by using 2-6 mol/L sulfuric acid for stripping the manganese-loaded organic phase, with a stripping O/A ratio of 3:1-1:1, stripping temperature of 25-45° C., stripping time of 10-30 min, and the stage of stripping of 2-5 to obtain a high-purity manganese sulfate solution.

In some possible embodiments, in step 1), when performing low-temperature calcination, the amount of ammonium sulfate added is 1.5 times theoretical reaction molar ratio of Li, Ni, Mn, and Co in the waste lithium-rich manganese-based cathode material; the calcination temperature is 500° C.; and the calcination holding time is 35 min; when the calcination product is leached with water, the solid-solution ratio of the leaching is 1:20 g/mL; the leaching temperature is 60° C.; and the leaching time is 35 min: in step 2), the amount of ammonium sulfite added is 5 times theoretical value of manganese complex precipitation in the leaching solution; when the complex reaction is performed, the pH value of the complex solution is adjusted to 10 with ammonia water; the complex reaction temperature is 70° C.; the complex reaction time is 60 min; and the aging time is 8 h. in step 3), when performing oxidation leaching, the oxidant is hydrogen peroxide: the amount of hydrogen peroxide added is 2 mol per liter of solution; and the solid-solution ratio of the leaching is 1:20 g/mL: the pH of the solution is adjusted to 5 with 98% concentrated sulfuric acid; the leaching temperature is 60° C.; and the leaching time is 25 min; and in step 4), the extractant is P204; the saponification agent is ammonia water with a molar concentration of 15 mol/L; the diluent is sulfonated kerosene; the extraction O/A phase ratio is 1:3; the extraction pH value is 5; the extraction temperature is 45° C.; the extraction time is 25 min; and the stage of extraction is 5; the manganese-loaded organic phase is stripped with 6 mol/L sulfuric acid; the stripping O/A ratio is 3:1: the stripping temperature is 45° C.: the stripping time is 30 min; and the stage of stripping is 5.

This is due to the fact that the manganese sulfate solution is obtained by performing the steps of calcining and leaching, complexing and manganese separating, oxidation and leaching, and extracting and stripping on the waste lithium-rich manganese-based cathode material, thus solving the problems of the conversion and recovery of valuable metals and the preferential extraction and purification of manganese in the waste lithium-rich manganese-based cathode material. At the same time, the key metals of lithium, nickel, manganese, and cobalt in the waste lithium-rich manganese-based cathode material can be efficiently converted by low-temperature calcination-water leaching, and the metal conversion rate can be more than 98%, greatly reducing the reaction time, reducing energy consumption and cost, and avoiding the use of toxic chemical reagents. The preferential enrichment of manganese in leaching solution can be achieved by complexation of manganese: the ratio of manganese to impurity (lithium, nickel, and cobalt) can be increased by more than 10 times, reducing the negative effects of other metals (lithium, nickel, and cobalt) on manganese extraction in the subsequent purification process, improving the purity of manganese products. The ratio of manganese and impurities in the whole process is increased by more than 200 times, and the recovery rate of manganese is more than 95%.

In order to further describe the technical solution of the present application in detail so as to support the technical problem to be solved by the present application, specific examples of the components of the waste lithium-rich manganese-based cathode material are described below; such as examples 2-6.

Example 2

Manganese was preferentially recovered from the waste lithium-rich manganese-based cathode material according to the following method:

The metal content in the waste lithium-rich manganese-based cathode material is as shown in Table 1:

TABLE 1

|  | Li | Ni | Mn | Co |
|---|---|---|---|---|
| Metal mass percentage | 7.74% | 19.97% | 30.50% | 2.6% |

Step 1) calcining and leaching: the waste lithium-rich manganese-based cathode material was mixed with ammonium sulfate, and then the mixture was subjected to calcination, wherein the amount of ammonium sulfate added was 1.1 times theoretical molar ratio of Li, Ni, Mn, and Co in the waste lithium-rich manganese-based cathode material: the calcination temperature was 300° C.; and the holding time was 15 min, to obtain a calcined product. The calcined product was leached with water, wherein the leaching solid-solution ratio was 1:5 g/mL; the leaching temperature was 25° C., and the leaching time was 20 min. After the completion of water leaching, solid-solution separation was performed to obtain leaching residue and a leaching solution. The leaching residue was subjected to concentrated treatment.

Step 2) complexing and manganese separating: the leaching solution obtained in step 1) was subjected to complexing and manganese separating using ammonium sulfite as a complexing agent. The amount added was 3 times theoretical value of manganese complex precipitation in the leaching solution. The pH value of the complex solution was adjusted to 7 with ammonia water. The complex reaction temperature was 25° C.; the complex reaction time was 20 min; and the aging time was 1 h. After the completion of aging, the manganese-rich residue and the manganese separating solution were obtained by filtration. The manganese separating solution was subjected to recovery of lithium, nickel, cobalt, etc.

Step 3) oxidation leaching: the manganese-rich residue obtained in step 2) was subjected to oxidation leaching to obtain a manganese-rich solution, wherein the leaching solid-solution ratio was 1:5 g/mL. Hydrogen peroxide was used as an oxidant, and the amount added was 0.5 mol per liter of the solution. The pH of the solution was adjusted to 1 with 98% concentrated sulfuric acid. The leaching temperature was 25° C., and the leaching time was 10 min to obtain the manganese-rich solution;

step 4) extracting and stripping: the manganese-rich solution obtained in step 3) was subjected to multi-stage manganese extraction, using P204 as an extraction agent, 5 mol/L ammonia water as a saponification agent, sulfonated kerosene as a diluent. Wherein the extraction O/A ratio was 1:1; the extraction pH value was 1: the extraction temperature was 25° C.: the extraction time was 5 min; and the stage of extraction was 2, to obtain a manganese-loaded organic phase and a raffinate. The raffinate was returned to the manganese separating solution obtained in step 2). The manganese-loaded organic phase was stripped with 2 mol/L sulfuric acid, wherein the stripping O/A ratio was 3:1: the stripping temperature was 25° C.: the stripping time was 10 min; and the stage of stripping was 2, so as to obtain a manganese sulfate solution.

Experimental results: the ratio of manganese-to-impurity increased by 205 times, and the recovery rate of manganese was 95.07%.

Example 3

Manganese was preferentially recovered from the waste lithium-rich manganese-based cathode material according to the following method:

The metal content in the waste lithium-rich manganese-based cathode material is as shown in Table 2:

TABLE 2

|  | Li | Ni | Mn |
|---|---|---|---|
| Metal mass percentage | 8.16% | 20.71% | 29.2% |

Step 1) calcining and leaching: the waste lithium-rich manganese-based cathode material was mixed with ammonium sulfate, and then the mixture was subjected to calcination, wherein the amount of ammonium sulfate added was 1.2 times theoretical molar ratio of Li, Ni, Mn, and Co in the waste lithium-rich manganese-based cathode material: the calcination temperature was 350° C.; and the holding time was 20 min, to obtain a calcined product. The calcined product was leached with water, wherein the leaching solid-solution ratio was 1:10 g/mL; the leaching temperature was 40° C., and the leaching time was 25 min. After the completion of water leaching, solid-solution separation was performed to obtain leaching residue and a leaching solution. The leaching residue was subjected to concentrated treatment.

Step 2) complexing and manganese separating: the leaching solution obtained in step 1) was subjected to complexing and manganese separating using ammonium sulfite as a complexing agent. The amount added was 3.5 times theoretical value of manganese complex precipitation in the leaching solution. The pH value of the complex solution was adjusted to 8 with ammonia water. The complex reaction temperature was 35° C.; the complex reaction time was 20 min; and the aging time was 3 h. After the completion of aging, the manganese-rich residue and the manganese separating solution were obtained by filtration. The manganese separating solution was subjected to recovery of lithium, nickel, cobalt, etc.

Step 3) oxidation leaching: the manganese-rich residue obtained in step 2) was subjected to oxidation leaching to obtain a manganese-rich solution, wherein the leaching solid-solution ratio was 1:10 g/mL. Hydrogen peroxide was used as an oxidant, and the amount added was 1 mol per liter of the solution. The pH of the solution was adjusted to 2 with 98% concentrated sulfuric acid. The leaching temperature was 40° C., and the leaching time was 20 min to obtain the manganese-rich solution;

Step 4) extracting and stripping: the manganese-rich solution obtained in step 3) was subjected to multi-stage manganese extraction, using P507 as an extraction agent, 10 mol/L ammonia water as a saponification agent, sulfonated kerosene as a diluent. Wherein the extraction O/A ratio was 1:1.5; the extraction pH value was 2; the extraction temperature was 35° C.; the extraction time was 15 min; and the stage of extraction was 3, to obtain a manganese-loaded organic phase and a raffinate. The raffinate was returned to the manganese separating solution obtained in step 2). The manganese-loaded organic phase was stripped with 2 mol/L sulfuric acid, wherein the stripping O/A ratio was 3:1; the stripping temperature was 25° C.: the stripping time was 10 min; and the stage of stripping was 2, so as to obtain a manganese sulfate solution.

Experimental results: the ratio of manganese-to-impurity increased by 208 times, and the recovery rate of manganese was 95.96%.

Example 4

Manganese was preferentially recovered from the waste lithium-rich manganese-based cathode material according to the following method:

The metal content in the waste lithium-rich manganese-based cathode material is as shown in Table 3:

TABLE 3

|  | Li | Ni | Mn |
|---|---|---|---|
| Metal mass percentage | 8.33% | 11.98% | 32.96% |

Step 1) calcining and leaching: the waste lithium-rich manganese-based cathode material was mixed with ammonium sulfate, and then the mixture was subjected to calcination, wherein the amount of ammonium sulfate added was 1.4 times theoretical molar ratio of Li, Ni, Mn, and Co in the waste lithium-rich manganese-based cathode material; the calcination temperature was 450° C.; and the holding time was 30 min, to obtain a calcined product. The calcined product was leached with water, wherein the leaching solid-solution ratio was 1:10 g/mL; the leaching temperature was 50° C., and the leaching time was 30 min. After the completion of water leaching, solid-solution separation was performed to obtain leaching residue and a leaching solution. The leaching residue was subjected to concentrated treatment.

Step 2) complexing and manganese separating: the leaching solution obtained in step 1) was subjected to complexing and manganese separating using ammonium sulfite as a complexing agent. The amount added was 4 times theoretical value of manganese complex precipitation in the leaching solution. The pH value of the complex solution was adjusted to 8 with ammonia water. The complex reaction temperature was 50° C.; the complex reaction time was 30 min; and the aging time was 5 h. After the completion of aging, the manganese-rich residue and the manganese separating solution were obtained by filtration. The manganese separating solution was subjected to recovery of lithium, nickel, cobalt, etc.

Step 3) oxidation leaching: the manganese-rich residue obtained in step 2) was subjected to oxidation leaching to obtain a manganese-rich solution, wherein the leaching solid-solution ratio was 1:15 g/mL. Hydrogen peroxide was used as an oxidant, and the amount added was 1.5 mol per liter of the solution. The pH of the solution was adjusted to 4 with 98% concentrated sulfuric acid. The leaching temperature was 50° C., and the leaching time was 25 min to obtain the manganese-rich solution:

Step 4) extracting and stripping: the manganese-rich solution obtained in step 3) was subjected to multistage manganese extraction, using P507 as an extraction agent, 10 mol/L ammonia water as a saponification agent, sulfonated kerosene as a diluent. Wherein the extraction O/A ratio was 1:2; the extraction pH value was 4; the extraction temperature was 40° C.; the extraction time was 20 min; and the stage of extraction was 3, to obtain a manganese-loaded organic phase and a raffinate. The raffinate was returned to the manganese separating solution obtained in step 2). The manganese-loaded organic phase was stripped with 4 mol/L sulfuric acid, wherein the stripping O/A ratio was 2:1; the stripping temperature was 35° C.: the stripping time was 25 min; and the stage of stripping was 3, so as to obtain a manganese sulfate solution.

Experimental results: the ratio of manganese-to-impurity increased by 216 times, and the recovery rate of manganese was 96.41%.

Example 5

Manganese was preferentially recovered from the waste lithium-rich manganese-based cathode material according to the following method:

The metal content in the waste lithium-rich manganese-based cathode material is as shown in Table 4:

TABLE 4

|  | Li | Ni | Mn | Co |
|---|---|---|---|---|
| Metal mass percentage | 8.32% | 9.39% | 33.3% | 4.71% |

Step 1) calcining and leaching: the waste lithium-rich manganese-based cathode material was mixed with ammonium sulfate, and then the mixture was subjected to calcination, wherein the amount of ammonium sulfate added was 1.3 times theoretical molar ratio of Li, Ni, Mn, and Co in the waste lithium-rich manganese-based cathode material; the calcination temperature was 400° C.; and the holding time was 30 min, to obtain a calcined product. The calcined product was leached with water, wherein the leaching solid-solution ratio was 1:15 g/mL; the leaching temperature was 30° ° C., and the leaching time was 25 min. After the completion of water leaching, solid-solution separation was performed to obtain leaching residue and a leaching solution. The leaching residue was subjected to concentrated treatment.

Step 2) complexing and manganese separating: the leaching solution obtained in step 1) was subjected to complexing and manganese separating using ammonium sulfite as a complexing agent. The amount added was 4.5 times theoretical value of manganese complex precipitation in the leaching solution. The pH value of the complex solution was adjusted to 9.5 with ammonia water. The complex reaction temperature was 60° C.: the complex reaction time was 50 min; and the aging time was 6 h. After the completion of aging, the manganese-rich residue and the manganese separating solution were obtained by filtration. The manganese separating solution was subjected to recovery of lithium, nickel, cobalt, etc.

Step 3) oxidation leaching: the manganese-rich residue obtained in step 2) was subjected to oxidation leaching to obtain a manganese-rich solution, wherein the leaching solid-solution ratio was 1:10 g/mL. Hydrogen peroxide was used as an oxidant, and the amount added was 1 mol per liter of the solution. The pH of the solution was adjusted to 4.5 with 98% concentrated sulfuric acid. The leaching temperature was 50° C., and the leaching time was 20 min to obtain the manganese-rich solution;

Step 4) extracting and stripping: the manganese-rich solution obtained in step 3) was subjected to multistage manganese extraction, using P204 as an extraction agent, 5 mol/L ammonia water as a saponification agent, sulfonated kerosene as a diluent. Wherein the extraction O/A ratio was 1:2.5; the extraction pH value was 4.5; the extraction temperature was 40° ° C.; the extraction time was 20 min; and the stage of extraction was 4, to obtain a manganese-loaded organic phase and a raffinate. The raffinate was returned to the manganese separating solution obtained in step 2). The manganese-loaded organic phase was stripped with 5 mol/L sulfuric acid, wherein the stripping O/A ratio was 2.5:1; the stripping temperature was 40° C.: the stripping time was 25 min; and the stage of stripping was 4, so as to obtain a manganese sulfate solution.

Experimental results: the ratio of manganese-to-impurity increased by 228 times, and the recovery rate of manganese was 97.42%.

Example 6

Manganese was preferentially recovered from the waste lithium-rich manganese-based cathode material according to the following method:

The metal content in the waste lithium-rich manganese-based cathode material is as shown in Table 5:

TABLE 4

|  | Li | Ni | Mn | Co |
|---|---|---|---|---|
| Metal mass percentage | 9.4% | 23.96% | 32.48% | 4% |

Step 1) calcining and leaching: the waste lithium-rich manganese-based cathode material was mixed with ammonium sulfate, and then the mixture was subjected to calcination, wherein the amount of ammonium sulfate added was 1.5 times theoretical molar ratio of Li, Ni, Mn, and Co in the waste lithium-rich manganese-based cathode material; the calcination temperature was 500° C.; and the holding time was 35 min, to obtain a calcined product. The calcined product was leached with water, wherein the leaching solid-solution ratio was 1:20 g/mL: the leaching temperature was 60° C., and the leaching time was 35 min. After the completion of water leaching, solid-solution separation was performed to obtain leaching residue and a leaching solution. The leaching residue was subjected to concentrated treatment.

Step 2) complexing and manganese separating: the leaching solution obtained in step 1) was subjected to complexing and manganese separating using ammonium sulfite as a complexing agent. The amount added was 5 times theoretical value of manganese complex precipitation in the leaching solution. The pH value of the complex solution was adjusted to 10 with ammonia water. The complex reaction temperature was 70° C.; the complex reaction time was 60 min; and the aging time was 8 h. After the completion of aging, the manganese-rich residue and the manganese separating solution were obtained by filtration. The manganese separating solution was subjected to recovery of lithium, nickel, cobalt, etc.

Step 3) oxidation leaching: the manganese-rich residue obtained in step 2) was subjected to oxidation leaching to obtain a manganese-rich solution, wherein the leaching solid-solution ratio was 1:20 g/mL. Hydrogen peroxide was used as an oxidant, and the amount added was 2 mol per liter of the solution. The pH of the solution was adjusted to 5 with 98% concentrated sulfuric acid. The leaching temperature was 60° C., and the leaching time was 25 min to obtain the manganese-rich solution:

Step 4) extracting and stripping: the manganese-rich solution obtained in step 3) was subjected to multistage manganese extraction, using P204 as an extraction agent, 15 mol/L ammonia water as a saponification agent, sulfonated kerosene as a diluent. Wherein the extraction O/A ratio was 1:3; the extraction pH value was 5; the extraction temperature was 45° C.: the extraction time was 25 min; and the stage of extraction was 5, to obtain a manganese-loaded organic phase and a raffinate. The raffinate was returned to the manganese separating solution obtained in step 2). The manganese-loaded organic phase was stripped with 6 mol/L sulfuric acid, wherein the stripping O/A ratio was 3:1: the stripping temperature was 45° C.: the stripping time was 30 min; and the stage of stripping was 5, so as to obtain a manganese sulfate solution.

Test Results: the ratio of manganese-to-impurity was increased 233 times, and the recovery rate of manganese was 97.59%.

Among them, example 6 is a method for preferentially recovering manganese from the waste lithium-rich manganese-based cathode material under optimal conditions, in which the manganese-to-impurity ratio was increased by 233 times and the recovery rate of manganese was 97.59%.

Finally, it should be noted that the terms "include", "comprise", or any other variation thereof are intended to cover non-exclusive inclusion, so that a process, method, item, or device that includes a series of elements not only includes those elements, but also other elements that are not explicitly listed, or also include elements inherent in such a process, method, item, or device.

While preferred embodiments of the present invention have been described, additional variations and modifications to these embodiments will occur to those skilled in the art once the basic inventive concept is known. Therefore, it is intended that the appended claims be interpreted as including the preferred embodiments and all alterations and modifications that fall within the scope of the present invention.

It will be apparent to those skilled in the art that various modifications and variations can be made in the present invention without departing from the spirit or scope of the inventions. Thus, provided that these modifications and variations of the present invention fall within the scope of the claims of the present invention and their equivalents, they are also intended to be included.

What is claimed is:

1. A method for preferentially recovering manganese from a waste lithium-rich manganese-based cathode material, comprising:

step 1) calcining and leaching: mixing the waste lithium-rich manganese-based cathode material with ammonium sulfate and then performing low-temperature calcination to obtain a calcination product, leaching the calcination product with water, and performing solid-solution separation after the completion of the water leaching to obtain leaching residue and a leaching solution;

step 2) complexing and manganese separating: adding ammonium sulfite to the leaching solution obtained in step 1) for a complex reaction, aging after the completion of the complex reaction, and filtering after the completion of the aging to obtain manganese-rich residue and a manganese-separated solution; in step 2), the amount of ammonium sulfite added is 3-5 times @ theoretical value of manganese complex in the leaching solution; and in step 2), when the complex reaction is performed, the pH value of the complex solution is adjusted to 7-10 with ammonia water; the complex reaction temperature is 25-70° C.; the complex reaction time is 20-60 min; and the aging time is 1-8 h;

step 3) oxidation leaching: adding an oxidant to the manganese-rich residue obtained in step 2) to perform oxidation leaching, adding 98% concentrated sulfuric acid to adjust the pH of the solution, and obtaining a manganese-rich solution after the completion of the reaction; in step 3), when performing oxidation leaching, the oxidant is hydrogen peroxide; the amount of hydrogen peroxide added is 0.5-2 mol per liter of the solution; and the solid-solution ratio of the leaching is 1:5-1:20 g/mL; and in step 3), the pH of the solution is adjusted to 1-5 with 98% concentrated sulfuric acid; the leaching temperature is 25-60° C.; and the leaching time is 10-25 min; and step 4) extracting and stripping: performing multi-stage extraction of manganese on the manganese-rich solution obtained in step 3) to obtain a manganese-loaded organic phase and a raffinate; mixing the raffinate with the manganese-separated solution obtained in step 2) for a recovery treatment, and stripping the manganese-loaded organic phase to obtain a manganese sulfate solution.

2. The method for preferentially recovering manganese from the waste lithium-rich manganese-based cathode material of claim 1, wherein:

in step 1), when performing low-temperature calcination, the amount of ammonium sulfate added is 1.1-1.5 times a theoretical reaction number of moles of Li, Ni, Mn, and Co combined in the waste lithium-rich manganese-based cathode material; the calcination temperature is 300-500° C.; and the calcination holding time is 15-35 min.

3. The method for preferentially recovering manganese from the waste lithium-rich manganese-based cathode material of claim 2, wherein:

in step 1), when the calcination product is leached with water, the solid-solution ratio of the leaching is 1:5-1:20 g/mL; the leaching temperature is 25-60° C.; and the leaching time is 20-40 min.

4. The method for preferentially recovering manganese from the waste lithium-rich manganese-based cathode material of claim 3, wherein:

in step 4), an extractant is one of P204 and P507; a saponification agent is ammonia water with a molar concentration of 5-15 mol/L; a diluent is sulfonated kerosene;

the extraction O/A phase ratio is 1:1-1:3; the extraction pH value is 1-5; the extraction temperature is 25-45° C.; the extraction time is 5-25 min; and the number of extraction stages is 2-5.

5. The method for preferentially recovering manganese from the waste lithium-rich manganese-based cathode material of claim 4, wherein:

in step 4), the manganese-loaded organic phase is stripped with 2-6 mol/L sulfuric acid; the stripping O/A phase ratio is 3:1-1:1; the stripping temperature is 25-45° C.; the stripping time is 10-30 min; and the number of stripping stages is 2-5, to obtain the manganese sulfate solution.

6. The method for preferentially recovering manganese from the waste lithium-rich manganese-based cathode material of claim 5, wherein:

in step 1), when performing low-temperature calcination, the amount of ammonium sulfate added is 1.5 times the theoretical reaction number of moles of Li, Ni, Mn, and Co combined in the waste lithium-rich manganese-based cathode material; the calcination temperature is 500° C.; and the calcination holding time is 35 min; when the calcination product is leached with water, the solid-solution ratio of the leaching is 1:20 g/mL; the leaching temperature is 60° C.; and the leaching time is 35 min;

in step 2), the amount of ammonium sulfite added is 5 times the theoretical value of manganese complex in the leaching solution; when the complex reaction is performed, the pH value of the complex solution is adjusted to 10 with ammonia water; the complex reaction temperature is 70° C.; the complex reaction time is 60 min; and the aging time is 8 h;

in step 3), when performing oxidation leaching, the oxidant is hydrogen peroxide; the amount of hydrogen peroxide added is 2 mol per liter of solution; and the solid-solution ratio of the leaching is 1:20 g/mL; the pH of the solution is adjusted to 5 with 98% concentrated sulfuric acid; the leaching temperature is 60° C.; and the leaching time is 25 min; and in step 4), the extractant is P204; the saponification agent is ammonia water with a molar concentration of 15 mol/L; the diluent is sulfonated kerosene; the extraction O/A phase ratio is 1:3; the extraction pH value is 5; the extraction temperature is 45° C.; the extraction time is 25 min; and the number of extraction stages is 5; the manganese-loaded organic phase is stripped with 6 mol/L sulfuric acid; the stripping O/A ratio is 3:1; the stripping temperature is 45° C.; the stripping time is 30 min; and the number of stripping stages is 5.

7. The method for preferentially recovering manganese from the waste lithium-rich manganese-based cathode material of claim 1, wherein:

the amount of ammonium sulfate added is 1.1 to 1.5 times a theoretical molar amount required for a reaction with Li, Ni, Mn, and Co in the waste lithium-rich manganese-based cathode material.

* * * * *